United States Patent
Park et al.

(10) Patent No.: US 11,416,833 B2
(45) Date of Patent: Aug. 16, 2022

(54) PAYMENT SERVICE APPARATUS FOR PROVIDING PRODUCT INFORMATION TO OFFLINE MERCHANT ON BASIS OF LOCATION INFORMATION AND SUPPORTING PAYMENT PROCESSING BASED ON VIRTUAL CURRENCY AND OPERATING METHOD THEREOF

(71) Applicant: UBIFUN CO., LTD., Seoul (KR)

(72) Inventors: Jin Hwan Park, Seoul (KR); Ji Sung Kim, Seoul (KR)

(73) Assignee: UBIFUN CO., LTD., Seoul (KR)

( * ) Notice: Subject to any disclaimer, the term of this patent is extended or adjusted under 35 U.S.C. 154(b) by 107 days.

(21) Appl. No.: 16/977,814

(22) PCT Filed: Mar. 5, 2020

(86) PCT No.: PCT/KR2020/003135
§ 371 (c)(1),
(2) Date: Sep. 3, 2020

(87) PCT Pub. No.: WO2020/209503
PCT Pub. Date: Oct. 15, 2020

(65) Prior Publication Data
US 2021/0248572 A1    Aug. 12, 2021

(30) Foreign Application Priority Data
Apr. 8, 2019  (KR) .......... 10-2019-0040791

(51) Int. Cl.
*G06Q 20/00* (2012.01)
*G06Q 20/06* (2012.01)
(Continued)

(52) U.S. Cl.
CPC ....... *G06Q 20/065* (2013.01); *G06Q 20/3678* (2013.01); *G06Q 20/4015* (2020.05); *H04B 17/318* (2015.01)

(58) Field of Classification Search
CPC .................................................. G06Q 20/065
See application file for complete search history.

(56) References Cited

U.S. PATENT DOCUMENTS

| 2009/0012706 A1 | 1/2009 | Kim |
| 2017/0017954 A1* | 1/2017 | McDonough ......... H04L 9/3239 |
| 2017/0236124 A1* | 8/2017 | Wagner ............. G06Q 20/3224 |
| | | 705/44 |

FOREIGN PATENT DOCUMENTS

| KR | 10-2008-0036423 A | 4/2008 |
| KR | 10-2011-0116784 A | 10/2011 |

(Continued)

OTHER PUBLICATIONS

IEEE Consumer Electronics Magazine (vol. 6, Issue: 2, pp. 78-88) Authors: Alak Majumder • Joyeeta Goswami • et al. Pay-Cloak: A Biometric Back Cover for Smartphones: Facilitating secure contactless payments and identity (Year: 2017).*

*Primary Examiner* — Bruce I Ebersman
*Assistant Examiner* — John A Anderson
(74) *Attorney, Agent, or Firm* — Park, Kim & Suh, LLC (57) ABSTRACT

Disclosed are a payment service apparatus for providing product information to an offline merchant on the basis of location information and supporting payment processing based on a virtual currency and an operating method thereof. The present invention selects offline merchants positioned within a predetermined distance based on current location information of a user terminal and then selects a merchant that transmits a beacon signal having a maximum strength among beacon signals transmitted by beacons provided in the selected merchants and transmits product information for (Continued)

products being sold in the merchant to the user terminal, and when the information on the virtual currency amount of the one predetermined product together with a payment request for one predetermined product from the user terminal are received, completes transfer processing from an electronic wallet account of a user to the electronic wallet account of the merchant for a virtual currency amount of one predetermined product to support the user to easily purchase the product in the offline merchant.

9 Claims, 2 Drawing Sheets

(51) Int. Cl.
  *G06Q 20/40* (2012.01)
  *G06Q 20/36* (2012.01)
  *H04B 17/318* (2015.01)

(56) References Cited

FOREIGN PATENT DOCUMENTS

| | | |
|---|---|---|
| KR | 10-2014-0113764 A | 9/2014 |
| KR | 10-1931330 B1 | 12/2018 |

* cited by examiner

FIG. 1

PAYMENT SERVICE APPARATUS FOR PROVIDING PRODUCT INFORMATION TO OFFLINE MERCHANT ON BASIS OF LOCATION INFORMATION AND SUPPORTING PAYMENT PROCESSING BASED ON VIRTUAL CURRENCY AND OPERATING METHOD THEREOF

CROSS-REFERENCE TO RELATED APPLICATIONS

This application is the National Stage filing under 35 U.S.C. 371 of International Application No. PCT/KR2020/003135, filed on Mar. 5, 2020, which claims the benefit of Korean Patent Application No. 10-2019-0040791, filed on Apr. 8, 2019, the contents of which are all hereby incorporated by reference herein in their entirety.

TECHNICAL FIELD

The present invention relates to a payment service apparatus for providing product information to an offline merchant on the basis of location information and supporting payment processing based on a virtual currency and an operating method thereof.

BACKGROUND ART

More and more people are buying products through online shopping because of the great advantage of no time or space constraint. However, when purchasing products, there are still a lot of people who are still looking for offline merchant stores because of the merit of taking a closer look.

Normally, people who are looking for an offline merchant store tend to go around several stores because the people do not know if their preferred products exist in the store.

However, if the people go around several stores, the people will waste time and the people can be a bit physically stressful.

Further, if the people go around several merchants with cash or credit card, the people may be afraid of losing the cash or credit card thereof.

Moreover, since a method of processing payments for products using existing cash or credit cards requires a lot of time in the payment process, there may be an inconvenience that people who want to purchase products in the offline merchant store must wait in line.

Therefore, in addition to a method of directly visiting various merchants to find preferred products and a method of processing payments by cash or credit card, a research is required, into a payment processing method for supporting information on products sold in the offline merchant stores to be rapidly checked by using portable terminals that the people usually carry and the products sold in the offline merchant stores to be rapidly and conveniently paid.

Further, although an interest in virtual currency has increased due to the development of block chain technology in recent years, a platform supporting the use of the virtual currency as a means of trading for goods has not been properly established, so that a function of the virtual currency as a currency is not fully realized.

Accordingly, there is a need for research on a payment processing service that supports users to freely purchase products using the virtual currency.

DISCLOSURE

Technical Problem

A payment service apparatus and an operating method thereof according to the present invention select offline merchants positioned within a predetermined distance based on current location information of a user terminal and then select a merchant that transmits a beacon signal having a maximum strength among beacon signals transmitted by beacons provided in the selected merchants and transmit product information for products being sold in the merchant to the user terminal, and when the information on the virtual currency amount of the one predetermined product together with a payment request for one predetermined product from the user terminal are received, complete transfer processing from an electronic wallet account of a user to the electronic wallet account of the merchant for a virtual currency amount of one predetermined product to support the user to easily purchase the product in the offline merchant.

Technical Solution

A payment service apparatus for providing product information to an offline merchant and supporting payment processing based on a virtual currency according to an embodiment of the present invention includes: a merchant information database storing an identifier for each of a plurality of merchants and location information of a point at which each of the plurality of merchants is positioned and a beacon identifier of a beacon provided in each of the plurality of merchants to correspond to each other; a product information database storing the identifier for each of the plurality of merchants and the product information for the sold products for each of the plurality of merchants, in which the product information is information including a name of the product, an image of the product, and a virtual currency amount required for purchasing the product, to correspond to each other; an identifier selecting unit receiving location information for a current location of the user terminal from the user terminal and selecting an identifier for at least one merchant storing location information of a point positioned within a predetermined distance based on the location information in the merchant information database; a merchant selecting unit receiving, after the identifier for the at least one merchant is selected, a beacon signal strength and a beacon identifier transmitted by the beacon provided in each of the at least one merchant from the user terminal and selecting an identifier for a first merchant storing a first beacon identifier having a maximum beacon signal strength among identifiers for the at least one merchant in the merchant information database; a product information transmitting unit extracting, when the identifier for the first merchant is selected, product information for first products stored to correspond to the identifier for the first merchant from the product information database and transmitting the product information for the first products to the user terminal; and a payment agency processing unit, transmitting, when a payment request for a second product which is any one product selected among the first products and information on the virtual currency amount of the second product are received from the user terminal, a payment processing completion message for the second product to the user terminal after completing transfer processing from the electronic wallet account of a user to the electronic wallet account of the first merchant for the virtual currency amount of the second product.

An operating method of a payment service apparatus for providing product information to an offline merchant and supporting payment processing based on a virtual currency according to an embodiment of the present invention includes: maintaining a merchant information database, in which an identifier for each of a plurality of merchants and location information of a point at which each of the plurality of merchants is positioned and a beacon identifier of a beacon provided in each of the plurality of merchants are stored to correspond to each other; maintaining a product information database storing the identifier for each of the plurality of merchants and the product information for the sold products for each of the plurality of merchants, in which the product information is information including a name of the product, an image of the product, and a virtual currency amount required for purchasing the product, to correspond to each other; receiving location information for a current location of the user terminal from the user terminal and selecting an identifier for at least one merchant storing location information of a point positioned within a predetermined distance based on the location information in the merchant information database; receiving, after the identifier for the at least one merchant is selected, a beacon signal strength and a beacon identifier transmitted by the beacon provided in each of the at least one merchant from the user terminal and selecting an identifier for a first merchant storing a first beacon identifier having a maximum beacon signal strength among identifiers for the at least one merchant in the merchant information database; extracting, when the identifier for the first merchant is selected, product information for first products stored to correspond to the identifier for the first merchant from the product information database and transmitting the product information for the first products to the user terminal; and transmitting, when a payment request for a second product which is any one product selected among the first products and information on the virtual currency amount of the second product are received from the user terminal, a payment processing completion message for the second product to the user terminal after completing transfer processing from the electronic wallet account of a user to the electronic wallet account of the first merchant for the virtual currency amount of the second product.

Advantageous Effects

A payment service apparatus and an operating method thereof according to the present invention select offline merchants positioned within a predetermined distance based on current location information of a user terminal and then select a merchant that transmits a beacon signal having a maximum strength among beacon signals transmitted by beacons provided in the selected merchants and transmit product information for products being sold in the merchant to the user terminal, and when the information on the virtual currency amount of the one predetermined product together with a payment request for one predetermined product from the user terminal are received, complete transfer processing from an electronic wallet account of a user to the electronic wallet account of the merchant for a virtual currency amount of one predetermined product to support the user to easily purchase the product in the offline merchant.

MODE FOR INVENTION

Hereinafter, embodiments of the present invention will be described in detail with reference to the accompanying drawings. The description does not limit the present invention to specific embodiments, and it should be understood that the present invention covers all the modifications, equivalents and replacements included within the idea and technical scope of the present invention. In describing each drawing, like reference numerals refer to like elements and if it is not contrarily defined, all terms used herein including technological or scientific terms have the same meanings as those generally understood by a person with ordinary skill in the art.

In this document, unless explicitly described to the contrary, the word "comprise" and variations such as "comprises" or "comprising", will be understood to imply the inclusion of stated elements but not the exclusion of any other elements. Further, in various embodiments of the present invention, each of components, functional blocks or means may be constituted by one or more lower components and electrical, electronic, and mechanical functions performed by respective components may be implemented as various known devices or mechanical elements including an electronic circuit, an integrated circuit, an Application Specific Integrated Circuit (ASIC), etc., and the respective components may be separately implemented or two or more components may be integrated into one and implemented.

Meanwhile, blocks of the accompanying block diagram or steps of a flowchart may be appreciated as meaning computer program instructions mounted on a processor or a memory of data processible equipment such as a universal computer, a special computer, a portable notebook computer, a network computer, etc., and performing designated functions. Since the computer program instructions may be stored in a memory provided in a computer device or a computer readable memory, functions described in blocks of a block diagram or steps of a flowchart may be produced as a manufactured object including an instruction mean performing the functions. Moreover, each block or each step may represent a part of a module, a segment, or a code that includes one or more executable instructions for executing a specified logical function(s). It should also be noted that in some replaceable embodiments, the functions mentioned in the blocks or steps may also be executed differently from a predetermined order. For example, two blocks or steps that are sequentially illustrated are substantially simultaneously carried out, or may be performed in a reverse order, and in some cases, the blocks or steps may be performed while some blocks or steps are omitted.

Figure 1:
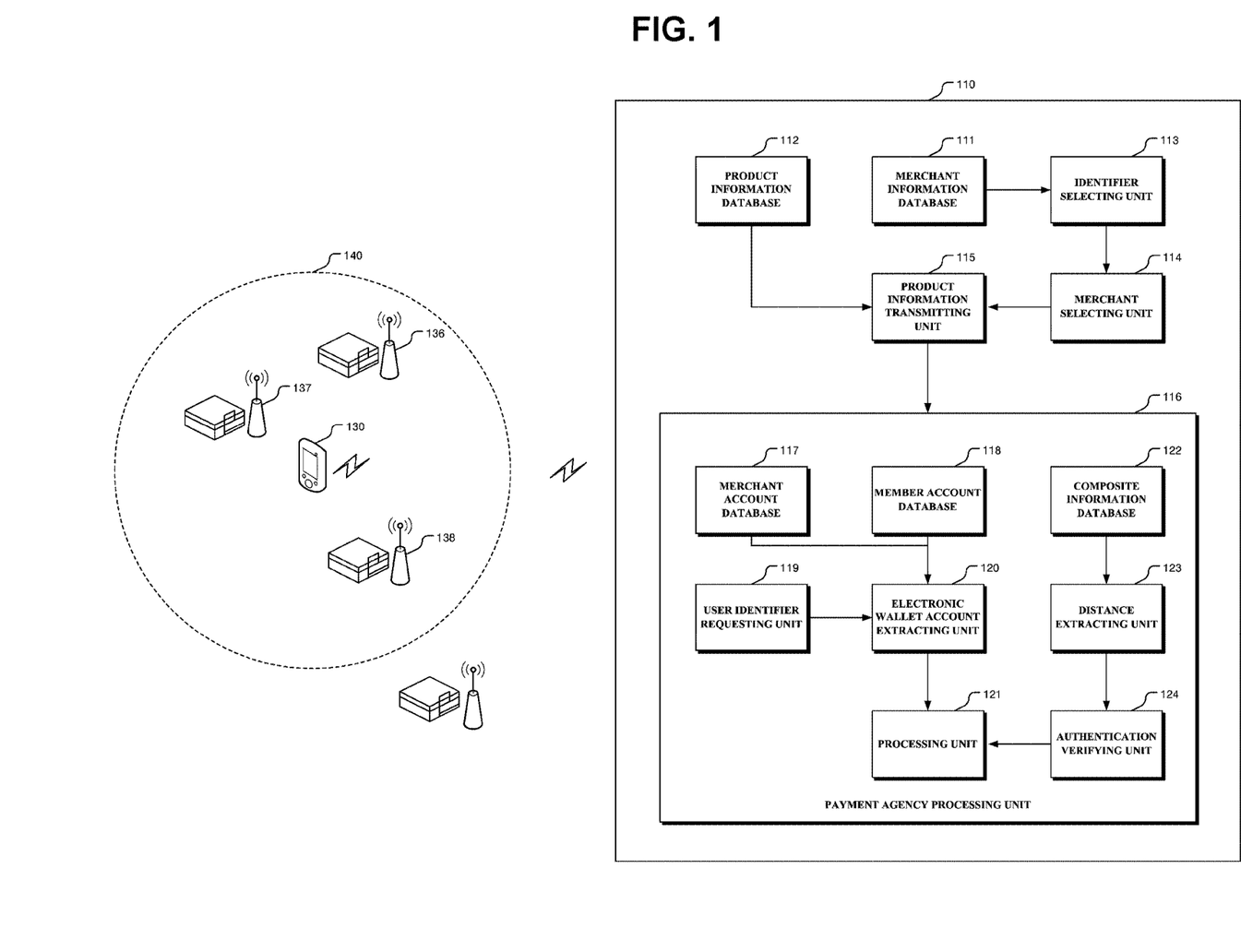
FIG. 1 is a diagram illustrating a structure of a payment service apparatus for providing product information to an offline merchant and supporting payment processing based on a virtual currency according to an embodiment of the present invention.

FIG. 1 is a diagram illustrating a structure of a payment service apparatus for providing product information to an offline merchant based on location information and supporting payment processing based on a virtual currency according to an embodiment of the present invention.

Referring to FIG. 1, the payment service apparatus 110 for providing product information to an offline merchant based on location information and supporting payment processing based on a virtual currency according to the present invention includes a merchant information database 111, a product information database 112, an identifier selecting unit 113, a merchant selecting unit 114, a product information transmitting unit 115, and a payment agency processing unit 116.

In the merchant information database 111, an identifier for each of a plurality of merchants and location information of a point at which each of the plurality of merchants is positioned and a beacon identifier of a beacon provided in each of the plurality of merchants are stored to correspond to each other.

Here, the plurality of merchants means stores which exist offline, which sell various products.

In addition, the beacon refers to a wireless communication device that may transmit data by recognizing a mobile device at a short distance. If near field communication (NFC) which is short-range wireless communication may be used only at a distance within 10 cm, the beacon may operate up to a distance of 70 m.

In this case, information as shown in Table 1 below may be stored in the merchant information database 111.

TABLE 1

| Identifiers of merchants | Location information of merchants (latitude, longitude) | Beacon identifier provided in merchants |
| --- | --- | --- |
| Identifier 1 | (37.553594, 126.924526) | Beacon identifier 1 |
| Identifier 2 | (37.553232, 126.924022) | Beacon identifier 2 |
| Identifier 3 | (37.552841, 126.924606) | Beacon identifier 3 |
| Identifier 4 | (37.552420, 126.924778) | Beacon identifier 4 |
| . . . | . . . | . . . |

The identifier for each of the plurality of merchants and product information for sold products of each of the plurality of merchants are stored in the product information database 112 to correspond to each other. Here, the product information means information including a name of the product, an image of the product, and a virtual currency amount required for purchasing the product.

For example, information as shown in Table 2 below may be stored in the product information database 112.

TABLE 2

| Identifiers of merchants | Product information for products being sold in merchants |
| --- | --- |
| Identifier 1 | Product name: Product 1<br>Image of product: Image of product 1<br>Virtual currency amount required for purchasing: 0.053674983 BTC<br>Name of product: Product 2<br>Image of product: Image of product 2<br>Virtual currency amount required for purchasing: 0.06441171 BTC<br>. . . |
| Identifier 2 | Name of product: Product 6<br>Image of product: Image of product 6<br>Virtual currency amount required for purchasing: 0.02147057 BTC<br>Name of product: Product 7<br>Image of product: Image of product 7<br>Virtual currency amount required for purchasing: 0.032205855 BTC<br>. . . |
| . . . | . . . |

The identifier selecting unit 113 receives location information for a current location of the user terminal 130 from the user terminal 130 and selects an identifier for at least one merchant storing location information of a point positioned within a predetermined distance based on the location information in the merchant information database 111.

After the identifier for the at least one merchant is selected, the merchant selecting unit 114 receives a beacon signal strength and a beacon identifier transmitted by the beacon provided in each of the at least one merchant from the user terminal 130 and selects an identifier for a first merchant storing a first beacon identifier having a maximum beacon signal strength among identifiers for the at least one merchant in the merchant information database 111.

For example, when the current location of the user terminal 130 is '(37.553062, 126.924360)' and the predetermined distance is '70 m', the identifier selecting unit 113 may receive '(37.553062, 126.924360)' which is the current location of the user terminal 130 from the user terminal 130 and select 'identifier 1', 'identifier 2', and 'identifier 3' which are identifiers for respective merchants, which are stored to correspond to '(37.553594, 126.924526)', '(37.553232, 126.924022)', and '(37.552841, 126.924606)' which are locations of respective points positioned within '70 m' (140) based on the '(37.553062, 126.924360)', respectively, in the merchant information database 111.

As such, when the 'identifier 1', the 'identifier 2', and the 'identifier 3' are selected through the identifier selecting unit 113, the merchant selecting unit 114 may check beacon signal strengths transmitted by beacon 1 136, beacon 2 137, and beacon 3 138 provided in a total of three merchants, respectively and may confirm that the first beacon identifier has the maximum beacon signal strength after receiving 'beacon identifier 1', 'beacon identifier 2', and 'beacon identifier 3' which are the beacon identifiers from the user terminal 130. When the first beacon identifier is referred to as 'beacon identifier 1', the merchant selecting unit 114 may select 'identifier 1' which is the identifier for the merchant, which is stored to correspond to 'beacon identifier 1' in the merchant information database 111.

When the identifier for the first merchant is selected, the product information transmitting unit 115 extracts product information for first products stored to correspond to the identifier for the first merchant from the product information database 112 and transmits the product information for the first products to the user terminal 130.

In this case, according to an embodiment of the present invention, when the product information for the first products is received from the payment service apparatus 110, the user terminal 130 may display on a screen of the user terminal 130 names of the first products included in the product information for the first products, images of the first products, and information for virtual currency amounts required for purchasing the first products.

When a payment request for a second product which is any one product selected among the first products and information on the virtual currency amount of the second product are received from the user terminal 130, the payment agency processing unit 116 transmits a payment processing completion message for the second product to the user terminal 130 after completing transfer processing from the electronic wallet account of a user to the electronic wallet account of the first merchant for the virtual currency amount of the second product.

For example, when 'identifier 1' which is the identifier for the first merchant is selected by the merchant selecting unit 114, the product information transmitting unit 115 may extract product information for 'product 1, product 2, . . .' which are the first products stored to correspond to 'identifier 1' which is the identifier for the first merchant from the product information database 112 and transmit the product information for the 'product 1, product 2, . . . ' to the user terminal 130.

In this case, as 'product 2' is selected among 'product 1, product 2, . . . ' by the user, when the payment service apparatus 110 receives information on a virtual currency amount '0.06441171 BTC' of the 'product 2' from the user terminal 130 together with the payment request for the 'product 2' among 'product 1, product 2, . . . ', the payment agency processing unit 116 may transmit the payment processing completion message for the 'product 2' to the user terminal 130 after completing transfer processing from the electronic wallet account of the user to the electronic wallet account of the first merchant for the virtual currency amount '0.06441171 BTC' of the 'product 2'.

In this case, according to an embodiment of the present invention, the payment service apparatus 110 for providing the product information to the offline merchant and supporting the payment processing based on the virtual currency may further include a merchant account database 117 and a member account database 118.

The identifier for each of the plurality of merchants and electronic wallet account information used for accumulating the virtual currency for each of the plurality of merchants are stored in the merchant account database 117 to correspond to each other.

For example, information as shown in Table 3 below may be stored in the merchant account database 117.

TABLE 3

| Identifiers of merchants | Electronic wallet account information of merchants |
|---|---|
| Identifier 1 | 9TQatmjVzwdjrgJosPvZNAPRxBfgF3n7CQ |
| Identifier 2 | 63rnfoQgXo1CqvVQaAN4WnxjPE1Bez2ecd |
| . . . | . . . |

The identifier for each of a plurality of members and electronic wallet account information used for accumulating the virtual currency for each of the plurality of members are stored in the member account database 118 to correspond to each other.

For example, information as shown in Table 4 below may be stored in the member account database 118.

TABLE 4

| User identifiers of plurality of members | Electronic wallet account information of plurality of members |
|---|---|
| User identifier 1 | 5BFM7nDvpxwaaQyqSCYQ3b52uor8V3zDVM |
| User identifier 2 | 1QMkBzumTgSJ1ogA7rR6LvbrF5V4y8MW5S |
| . . . | . . . |

In this case, the payment agency processing unit 116 may include a user identifier requesting unit 119, an electronic wallet account extracting unit 120, and a processing unit 121.

When the information on the virtual currency amount of the second product is received from the user terminal 130 along with the payment request for the second product, the user identifier requesting unit 119 requests the user terminal 130 to transmit the user identifier.

When the first user identifier is received from the user terminal 130, the electronic wallet account extracting unit 120 extracts the electronic wallet account information of the user stored to correspond to the first user identifier from the member account database 118 and the electronic wallet account information of the first merchant stored to correspond to the identifier for the first merchant from the merchant account database 117.

The processing unit 121 completes the transfer processing from the electronic wallet account of the user to the electronic wallet account of the first merchant for the virtual currency amount of the second product based on the extracted electronic wallet account information of the user and the extracted electronic wallet account information of the first merchant.

For example, when the payment service apparatus 110 receives the information on the virtual currency amount '0.06441171 BTC' of the 'product 2' from the user terminal 130 along with the payment request for the 'product 2' which is the second product, the user identifier requesting unit 119 may request the transmission for the user identifier to the user terminal 130.

In this case, when the payment service apparatus 110 receives 'user identifier 1' as the first user identifier from the user terminal 130 and the identifier for the first merchant is referred to as 'identifier 1', the electronic wallet account extracting unit 120 may extract the information on the electronic wallet account of the user, '5BFM7nDvpxwaaQyqSCYQ3b52uor8V3zDVM' stored to correspond to 'user identifier 1' which is the first user identifier from the member account database 118 and the information on the electronic wallet account '9TQatmjVzwdjrgJosPvZNAPRxBfgF3n7CQ' of the first merchant stored to correspond to 'identifier 1' which is the identifier for the first merchant from the merchant account database 117.

Then, the processing unit 121 may complete the transfer processing from the electronic wallet account '5BFM7nDvpxwaaQyqSCYQ3b52uor8V3zDVM' of the user to the electronic wallet account '9TQatmjVzwdjrgJosPvZNAPRxBfgF3n7CQ' of the first merchant for the virtual currency amount '0.06441171 BTC' of the second product based on the extracted electronic wallet account information of the user and the extracted electronic wallet account information of the first merchant.

That is, the payment service apparatus 110 may select merchants positioned within a predetermined distance (140) based on current location information of a user terminal 130 and then select a first merchant that transmits a beacon signal having a maximum strength among beacon signals transmitted by beacons 136, 137, and 138 provided in the selected merchants and transmit product information for first products being sold in the first merchant to the user terminal 130, and when receiving the information on the virtual currency amount of the second product together with a payment request for the second product from the user terminal 130, complete transfer processing from an electronic wallet account of a user to the electronic wallet account of the first merchant for a virtual currency amount of the second product to support the user to easily purchase the product in the offline merchant.

According to an embodiment of the present invention, the payment agency processing unit 116 may include a composite information database 122, a distance extracting unit 123, an authentication verifying unit 124, and a processing unit 121.

The identifier for each of the plurality of merchants and information on different predetermined Euclidean distance values to be used for user authentication for each merchant are stored in the composite information database 122 to correspond to each other.

For example, information as shown in Table 5 below may be stored in the composite information database 122.

TABLE 5

| Identifiers of merchants | Euclidean distance |
|---|---|
| Identifier 1 | $D_1$ |
| Identifier 2 | $D_2$ |
| ... | ... |

Here, the Euclidean distance which means a distance between two vectors when there are two vectors may be calculated according to Equation 1 below.

$$D = \sqrt{\sum_{i=1}^{n}(p_i - q_i)^2} \quad \text{[Equation 1]}$$

In Equation 1 above, D represents the Euclidean distance, and $p_i$ and $q_i$ represent i-th components included in two vectors. In general, as the Euclidean distance between two vectors is smaller, the two vectors are regarded as similar vectors, and as the Euclidean distance between the two vectors, the two vectors may be regarded to as non-similar vectors.

When the information on the virtual currency amount of the second product is received from the user terminal 130 along with the payment request for the second product, the distance extracting unit 123 verifies the identifier for the first merchant and extracts a first Euclidean distance value stored to correspond to the identifier for the first merchant from the composite information database 122.

For example, if the virtual currency amount of 'product 2' which is the second product is '0.06441171 BTC', the identifier for the first merchant is 'identifier 1', and the first Euclidean distance value is '$D_1$', when the payment service apparatus 110 receives the information on the virtual currency amount '0.06441171 BTC' of 'product 2' which is the second product from the user terminal 130 along with the payment request for 'product 2' which is the second product, the distance extracting unit 123 may verify 'identifier 1' which is the identifier for the first merchant and extract '$D_1$' which is the first Euclidean distance value stored to correspond to 'identifier 1' which is the identifier for the first merchant from the composite information database 122.

When the first Euclidean distance value is extracted, the authentication verifying unit 124 randomly generates a random vector and transmits a transmission request of a feedback vector for the random vector to the user terminal 130, while transmitting the random vector and the identifier for the first merchant to the user terminal 130, and then when a first feedback vector (the first feedback vector is a vector generated so that the Euclidean distance from the random vector is calculated as the first Euclidean distance value prestored in the user terminal) is received as the feedback vector for the random vector from the user terminal 130, completes authentication for the user terminal 130 by verifying whether the Euclidean distance between the first feedback vector and the random vector is calculated as the first Euclidean distance value.

For example, when the random vector is referred to as a 12-dimensional vector and '$D_1$' which is the first Euclidean distance value is extracted from the payment service apparatus 110, the authentication verifying unit 124 randomly generates the 12-dimensional vector such as '(0,0,0,0,0,0,0, 0,0,0,1,0)' and transmits the transmission request of a 12-dimensional feedback vector for the 12-dimensional vector to the user terminal 130 while transmitting the 12-dimensional vector and 'identifier 1' which is the identifier for the first merchant to the user terminal 130, and then when a 12-dimensional first feedback vector is received from the user terminal 130, completes the authentication for the user terminal 130 by verifying whether the Euclidean distance between the 12-dimensional first feedback vector and the 12-dimensional vector is calculated as '$D_1$' which is the first Euclidean distance value In this case, according to an embodiment of the present invention, the user terminal 130 stores the identifier for each of the plurality of merchants and information on the different predetermined Euclidean distance values to be used for the user authentication for each merchant in the memory and when the random vector and the identifier for the first merchant are received from the payment service apparatus 110, the user terminal 130 may extract the first Euclidean distance value stored to correspond to the identifier for the first merchant from the memory and then randomly generate the first feedback vector of which the Euclidean distance from the random vector is calculated as the first Euclidean distance value extracted from the memory and transmit the generated first feedback vector to the payment service apparatus 110.

For example, when the identifier for each of the plurality of merchants and information on the different predetermined Euclidean distance values to be used for the user authentication for each merchant shown in Table 5 above are stored on the memory of the user terminal 130 and the user terminal 130 receives the 12-dimensional vector '(0,0,0,0,0,0,0,0,0, 0,1,0)' and 'identifier 1' which is the identifier for the first merchant from the payment service apparatus 110, the user terminal 130 may extract '$D_1$' which is the first Euclidean distance value stored to correspond to 'identifier 1' which is the identifier for the first merchant from the memory and then randomly generate the 12-dimensional first feedback vector of which the Euclidean distance from the 12-dimensional vector is calculated as '$D_1$' which is the first Euclidean distance value extracted from the memory and transmit the generated 12-dimensional first feedback vector to the payment service apparatus 110.

When the authentication for the user terminal 130 is completed, the processing unit 121 completes the transfer processing from the electronic wallet account of the user to the electronic wallet account of the first merchant for the virtual currency amount of the second product.

That is, when the authentication for the user terminal 130 is completed, the processing unit 121 may complete the transfer processing from the electronic wallet account '5BFM7nDvpxwaaQyqSCYQ3b52uor8V3zDVM' of the user to the electronic wallet account '9TQatmjVzwdjrgJosPvZNAPRxBfgF3n7CQ' of the first merchant for the virtual currency amount '0.06441171 BTC' of the second product.

According to another embodiment of the present invention, the payment service apparatus 110 may be configured to perform payment for a product purchased by the user in link with a POS payment terminal provided in each merchant. In this regard, the payment service apparatus 110 may be configured to perform the payment processing for the corresponding product by receiving the payment request for the product purchased by the user and the information on the virtual currency amount from the POS payment terminal provided in the merchant.

Figure 2:
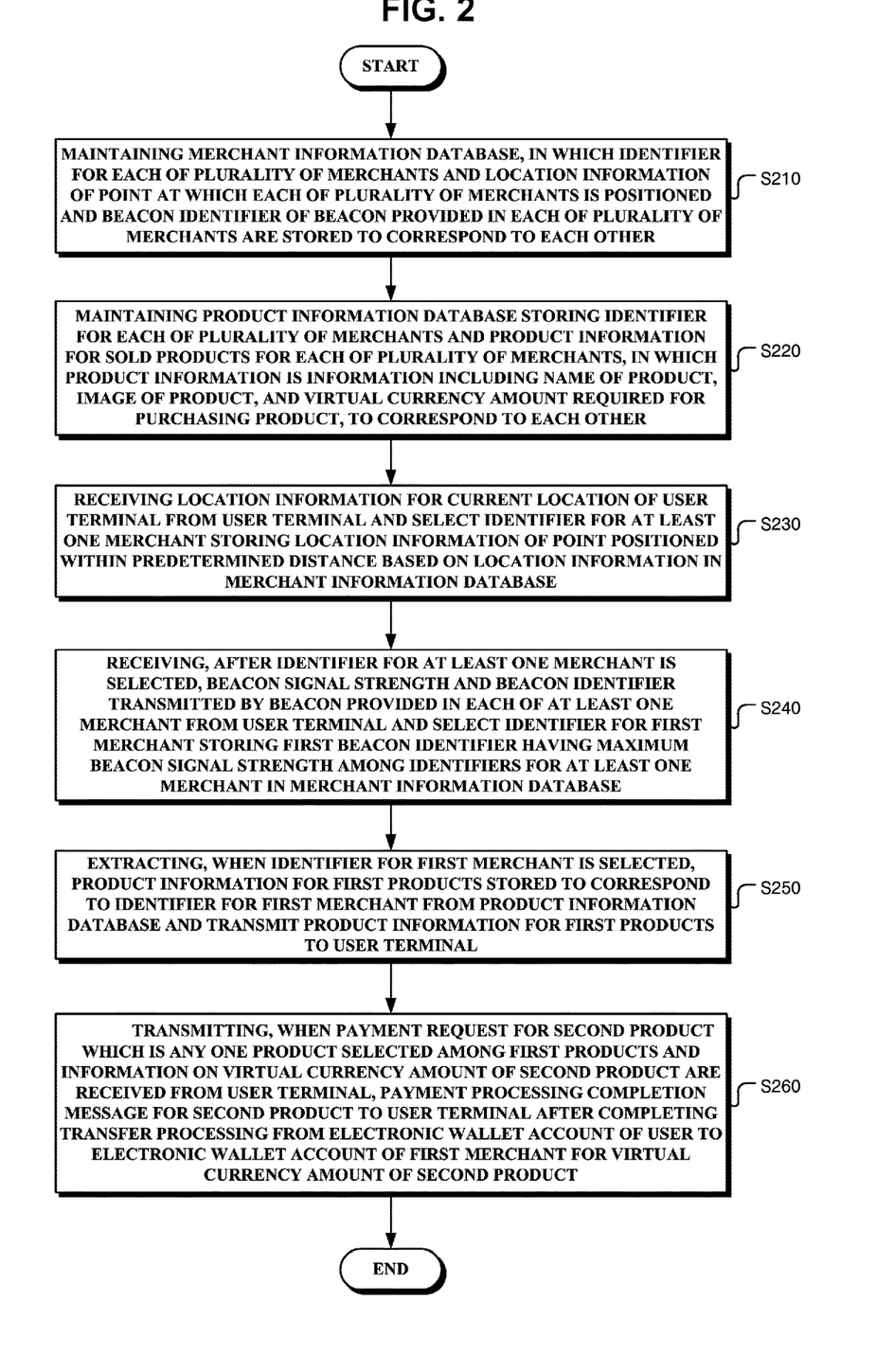
FIG. 2 is a flowchart showing an operating method of a payment service apparatus for providing product information to an offline merchant and supporting payment processing based on a virtual currency according to an embodiment of the present invention.

FIG. 2 is a flowchart showing an operating method of a payment service apparatus for providing product information to an offline merchant based on location information and supporting payment processing based on a virtual currency according to an embodiment of the present invention.

In step S210, the merchant information database is maintained, in which an identifier for each of a plurality of merchants and location information of a point at which each of the plurality of merchants is positioned and a beacon identifier of a beacon provided in each of the plurality of merchants are stored to correspond to each other.

In step S220, the product information database is maintained, in which the identifier for each of the plurality of merchants and the product information for the sold products for each of the plurality of merchants, in which the product information is information including a name of the product, an image of the product, and a virtual currency amount required for purchasing the product, are stored to correspond to each other.

In step S230, location information for a current location of the user terminal is received from the user terminal and an identifier for at least one merchant storing location information of a point positioned within a predetermined distance based on the location information in the merchant information database is selected.

In step S240, after the identifier for the at least one merchant is selected, a beacon signal strength and a beacon identifier transmitted by the beacon provided in each of the at least one merchant are received from the user terminal and an identifier for a first merchant storing a first beacon identifier having a maximum beacon signal strength in the merchant information database is selected among identifiers for the at least one merchant.

In step S250, when the identifier for the first merchant is selected, product information for first products stored to correspond to the identifier for the first merchant is extracted from the product information database and the product information for the first products is transmitted to the user terminal.

In step S260, when a payment request for a second product which is any one product selected among the first products and information on the virtual currency amount of the second product are received from the user terminal, a payment processing completion message for the second product is transmitted to the user terminal after completing transfer processing from the electronic wallet account of a user to the electronic wallet account of the first merchant for the virtual currency amount of the second product.

In this case, according to an embodiment of the present invention, the operating method of the payment service apparatus may further include: maintaining a merchant account database storing the identifier for each of the plurality of merchants and electronic wallet account information used for accumulating the virtual currency for each of the plurality of merchants to correspond to each other; and maintaining a member account database storing the user identifier for each of a plurality of members and electronic wallet account information used for accumulating the virtual currency for each of the plurality of members to correspond to each other.

In this case, step S260 may further include requesting, when the information on the virtual currency amount of the second product is received from the user terminal along with the payment request for the second product, the user terminal to transmit the user identifier, extracting, when the first user identifier is received from the user terminal, the electronic wallet account information of the user stored to correspond to the first user identifier from the member account database and the electronic wallet account information of the first merchant stored to correspond to the identifier for the first merchant from the merchant account database, and completing the transfer processing from the electronic wallet account of the user to the electronic wallet account of the first merchant for the virtual currency amount of the second product based on the extracted electronic wallet account information of the user and the extracted electronic wallet account information of the first merchant.

Further, according to an embodiment of the present invention, when the product information for the first products is received from the payment service apparatus, the user terminal may display on a screen of the user terminal names of the first products included in the product information for the first products, images of the first products, and information for virtual currency amounts required for purchasing the first products.

Further, according to an embodiment of the present invention, step S260 may include maintaining a composite information database storing the identifier for each of the plurality of merchants and information on different predetermined Euclidean distance values to be used for user authentication for each merchant to correspond to each other, verifying, when the information on the virtual currency amount of the second product is received from the user terminal along with the payment request for the second product, the identifier for the first merchant and extracting a first Euclidean distance value stored to correspond to the identifier for the first merchant from the composite information database, randomly generating, when the first Euclidean distance value is extracted, a random vector and transmitting a transmission request of a feedback vector for the random vector to the user terminal, while transmitting the random vector and the identifier for the first merchant to the user terminal, and then when a first feedback vector, in which the first feedback vector is a vector generated so that the Euclidean distance from the random vector is calculated as the first Euclidean distance value prestored in the user terminal, is received as the feedback vector for the random vector from the user terminal, completing authentication for the user terminal by verifying whether the Euclidean distance between the first feedback vector and the random vector is calculated as the first Euclidean distance value, and completing, when the authentication for the user terminal is completed, the transfer processing from the electronic wallet account of the user to the electronic wallet account of the first merchant for the virtual currency amount of the second product.

In this case, according to an embodiment of the present invention, the user terminal stores the identifier for each of the plurality of merchants and information on the different predetermined Euclidean distance values to be used for the user authentication for each merchant on the memory and when the random vector and the identifier for the first merchant are received from the payment service apparatus, the user terminal may extract the first Euclidean distance value stored to correspond to the identifier for the first merchant from the memory and then randomly generate the first feedback vector of which the Euclidean distance from the random vector is calculated as the first Euclidean distance value extracted from the memory and transmit the generated first feedback vector to the payment service apparatus.

Hereinabove, referring to FIG. 2, the operating method of the payment service apparatus for providing product information to an offline merchant based on location information and supporting payment processing based on a virtual currency according to an embodiment of the present invention is described. Here, since the operating method of the payment service apparatus for providing product information to an offline merchant based on location information and supporting payment processing based on a virtual currency according to an embodiment of the present invention may correspond to a configuration for an operation of the payment service apparatus 110 for providing product information to an offline merchant based on location information and supporting payment processing based on a virtual currency described by using FIG. 1, a more detailed description thereof will be omitted.

The operating method of the payment service apparatus for providing product information to an offline merchant based on location information and supporting payment processing based on a virtual currency according to an embodiment of the present invention may be implemented by a computer program stored in a storage medium, which is used to execute the operating method through a combination with a computer.

Further, the operating method of the payment service apparatus for providing product information to an offline merchant based on location information and supporting payment processing based on a virtual currency according to an embodiment of the present invention may be implemented in a program command type which may be performed through various computer means and recorded in a computer readable medium. The computer readable medium may singly or combinationally include a program command, a data file, or a data structure or a combination thereof. The program command recorded in the medium may be specially designed and configured for the present invention, or may be publicly known to and used by those skilled in the computer software field. Examples of the computer-readable recording medium include magnetic media such as a hard disk, a floppy disk, and a magnetic tape, optical media such as a CD-ROM and a DVD, magneto-optical media such as a floptical disk, and a hardware device which is specifically configured to store and execute the program command such as a ROM, a RAM, and a flash memory. Examples of the program command include a high-level language code executable by a computer by using an interpreter, and the like, as well as a machine language code created by a compiler.

As described above, the present invention has been described by specified matters such as detailed components, and the like and limited embodiments and drawings, but the description is just provided to assist more overall understanding of the present invention and the present invention is not limited to the embodiment and various modifications and changes can be made by those skilled in the art from such a disclosure.

Accordingly, the spirit of the present invention should not be defined only by the described embodiments, and it should be appreciated that claims to be described below and all things which are equivalent to the claims or equivalently modified to the claims are included in the scope of the spirit of the present invention.

The invention claimed is:

1. A payment service apparatus for providing product information to an offline merchant on the basis of location information and supporting payment processing based on a virtual currency, the payment service apparatus comprising:
    a merchant information database storing an identifier for each of a plurality of merchants and location information of a point at which each of the plurality of merchants is positioned and a beacon identifier of a beacon provided in each of the plurality of merchants to correspond to each other;
    a product information database storing the identifier for each of the plurality of merchants and product information for products being sold in each of the plurality of merchants, in which the product information is information including a name of the product, an image of the product, and a virtual currency amount required for purchasing the product, to correspond to each other;
    an identifier selecting unit receiving location information for a current location of a user terminal from the user terminal and selecting an identifier for at least one merchant storing location information of a point positioned within a predetermined distance based on the location information in the merchant information database;
    a merchant selecting unit receiving, after the identifier for the at least one merchant is selected, a signal strength and a beacon identifier of a beacon provided in each of the at least one merchant from the user terminal and selecting an identifier for a first merchant storing a first beacon identifier of a beacon having a maximum signal strength among the beacons provided in the at least one merchant;
    a product information transmitting unit extracting, when the identifier for the first merchant is selected, product information for first products stored to correspond to the identifier for the first merchant from the product information database and transmitting the product information for the first products to the user terminal; and
    a payment agency processing unit, transmitting, when a payment request for a second product which is any one product selected among the first products and information on the virtual currency amount of the second product are received from the user terminal, a payment processing completion message for the second product to the user terminal after completing transfer processing from the electronic wallet account of a user to the electronic wallet account of the first merchant for the virtual currency amount of the second product,
    wherein the payment agency processing unit includes:
        a composite information database storing the identifier for each of the plurality of merchants and information on different predetermined Euclidean distance values to be used for user authentication for each merchant to correspond to each other;
        a distance extracting unit verifying, when the information on the virtual currency amount of the second product is received from the user terminal along with the payment request for the second product, the identifier for the first merchant and extracting a first Euclidean distance value stored to correspond to the identifier for the first merchant from the composite information database;
        an authentication verifying unit randomly generating, when the first Euclidean distance value is extracted, a random vector and transmitting a transmission request of a feedback vector for the random vector to the user terminal, while transmitting the random vector and the identifier for the first merchant to the user terminal, and then when a first feedback vector, in which the first feedback vector is a vector generated so that the Euclidean distance from the random vector is calculated as the first Euclidean distance value prestored in the user terminal, is received as the feedback vector for the random vector from the user terminal, completing authentication for the user terminal by verifying whether the Euclidean distance between the first feedback vector and the random vector is calculated as the first Euclidean distance value; and a processing unit completing, when the authentication for the user terminal is completed, the transfer processing from the electronic wallet account of the user to the electronic wallet account of the first merchant for the virtual currency amount of the second product.

2. The payment service apparatus of claim 1, further comprising:

a merchant account database storing the identifier for each of the plurality of merchants and electronic wallet account information used for accumulating the virtual currency for each of the plurality of merchants to correspond to each other; and a member account database storing the identifier for each of a plurality of members and electronic wallet account information used for accumulating the virtual currency for each of the plurality of members to correspond to each other, wherein the payment agency processing unit includes a user identifier requesting unit requesting, when the information on the virtual currency amount of the second product is received from the user terminal along with the payment request for the second product, the user terminal to transmit the user identifier, an electronic wallet account extracting unit extracting, when the first user identifier is received from the user terminal, the electronic wallet account information of the user stored to correspond to the first user identifier from the member account database and the electronic wallet account information of the first merchant stored to correspond to the identifier for the first merchant from the merchant account database, and a processing unit completing the transfer processing from the electronic wallet account of the user to the electronic wallet account of the first merchant for the virtual currency amount of the second product based on the extracted electronic wallet account information of the user and the extracted electronic wallet account information of the first merchant.

3. The payment service apparatus of claim 1, wherein when the product information for the first products is received from the payment service apparatus, the user terminal displays on a screen of the user terminal names of the first products included in the product information for the first products, images of the first products, and information for virtual currency amounts required for purchasing the first products.

4. The payment service apparatus of claim 1, wherein the user terminal stores the identifier for each of the plurality of merchants and information on the different predetermined Euclidean distance values to be used for the user authentication for each merchant on the memory and when the random vector and the identifier for the first merchant are received from the payment service apparatus, the user terminal extracts the first Euclidean distance value stored to correspond to the identifier for the first merchant from the memory and then randomly generates the first feedback vector of which the Euclidean distance from the random vector is calculated as the first Euclidean distance value extracted from the memory and transmits the generated first feedback vector to the payment service apparatus.

5. An operating method of a payment service apparatus for providing product information to an offline merchant on the basis of location information and supporting payment processing based on a virtual currency, the operating method comprising:

maintaining a merchant information database, in which an identifier for each of a plurality of merchants and location information of a point at which each of the plurality of merchants is positioned and a beacon identifier of a beacon provided in each of the plurality of merchants are stored to correspond to each other;

maintaining a product information database storing the identifier for each of the plurality of merchants and product information for products being sold in each of the plurality of merchants, in which the product information is information including a name of the product, an image of the product, and a virtual currency amount required for purchasing the product, to correspond to each other;

receiving location information for a current location of a user terminal from the user terminal and selecting an identifier for at least one merchant storing location information of a point positioned within a predetermined distance based on the location information in the merchant information database;

receiving, after the identifier for the at least one merchant is selected, a signal strength and a beacon identifier of a beacon provided in each of the at least one merchant from the user terminal and selecting an identifier for a first merchant storing a first beacon identifier of a beacon having a maximum signal strength among the beacons provided in the at least one merchant;

extracting, when the identifier for the first merchant is selected, product information for first products stored to correspond to the identifier for the first merchant from the product information database and transmitting the product information for the first products to the user terminal; and transmitting, when a payment request for a second product which is any one product selected among the first products and information on the virtual currency amount of the second product are received from the user terminal, a payment processing completion message for the second product to the user terminal after completing transfer processing from the electronic wallet account of a user to the electronic wallet account of the first merchant for the virtual currency amount of the second product, wherein the transmitting of the payment processing completion message for the second product includes:

maintaining a composite information database storing the identifier for each of the plurality of merchants and information on different predetermined Euclidean distance values to be used for user authentication for each merchant to correspond to each other;

verifying, when the information on the virtual currency amount of the second product is received from the user terminal along with the payment request for the second product, the identifier for the first merchant and extracting a first Euclidean distance value stored to correspond to the identifier for the first merchant from the composite information database;

randomly generating, when the first Euclidean distance value is extracted, a random vector and transmitting a transmission request of a feedback vector for the random vector to the user terminal, while the random vector and the identifier for the first merchant to the user terminal, and then when a first feedback vector, in which the first feedback vector is a vector generated so that the Euclidean distance from the random vector is calculated as the first Euclidean distance value prestored in the user terminal, is received as the feedback vector for the random vector from the user terminal, completing authentication for the user terminal by verifying whether the Euclidean distance between the first feedback vector and the random vector is calculated as the first Euclidean distance value; and completing, when the authentication for the user terminal is completed, the transfer processing from the electronic wallet account of the user to the electronic wallet account of the first merchant for the virtual currency amount of the second product.

6. The operating method of claim 5, further comprising:
maintaining a merchant account database storing the identifier for each of the plurality of merchants and electronic wallet account information used for accumulating the virtual currency for each of the plurality of merchants to correspond to each other; and maintaining a member account database storing the user identifier for each of a plurality of members and electronic wallet account information used for accumulating the virtual currency for each of the plurality of members to correspond to each other, wherein the transmitting of the payment processing completion message for the second product includes requesting, when the information on the virtual currency amount of the second product is received from the user terminal along with the payment request for the second product, the user terminal to transmit the user identifier, extracting, when the first user identifier is received from the user terminal, the electronic wallet account information of the user stored to correspond to the first user identifier from the member account database and the electronic wallet account information of the first merchant stored to correspond to the identifier for the first merchant from the merchant account database, and completing the transfer processing from the electronic wallet account of the user to the electronic wallet account of the first merchant for the virtual currency amount of the second product based on the extracted electronic wallet account information of the user and the extracted electronic wallet account information of the first merchant.

7. The operating method of claim 5, wherein when the product information for the first products is received from the payment service apparatus, the user terminal displays on a screen of the user terminal names of the first products included in the product information for the first products, images of the first products, and information for virtual currency amounts required for purchasing the first products.

8. The operating method of claim 5, wherein the user terminal stores the identifier for each of the plurality of merchants and information on the different predetermined Euclidean distance values to be used for the user authentication for each merchant on the memory and when the random vector and the identifier for the first merchant are received from the payment service apparatus, the user terminal extracts the first Euclidean distance value stored to correspond to the identifier for the first merchant from the memory and then randomly generates the first feedback vector of which the Euclidean distance from the random vector is calculated as the first Euclidean distance value extracted from the memory and transmits the generated first feedback vector to the payment service apparatus.

9. A non-transitory computer readable recording medium having a program recorded therein for allowing a computer to execute an operating method of a payment service apparatus for providing product information to an offline merchant on the basis of location information and supporting payment processing based on a virtual currency, the operating method comprising:

maintaining a merchant information database, in which an identifier for each of a plurality of merchants and location information of a point at which each of the plurality of merchants is positioned and a beacon identifier of a beacon provided in each of the plurality of merchants are stored to correspond to each other;

maintaining a product information database storing the identifier for each of the plurality of merchants and the product information for products being sold in each of the plurality of merchants, in which the product information is information including a name of the product, an image of the product, and a virtual currency amount required for purchasing the product, to correspond to each other;

receiving location information for a current location of ache user terminal from the user terminal and selecting an identifier for at least one merchant storing location information of a point positioned within a predetermined distance based on the location information in the merchant information database;

receiving, after the identifier for the at least one merchant is selected, a signal strength and a beacon identifier of a beacon provided in each of the at least one merchant from the user terminal and selecting an identifier for a first merchant storing a first beacon identifier of a beacon having a maximum signal strength among among the beacons provided in the at least one merchant;

extracting, when the identifier for the first merchant is selected, product information for first products stored to correspond to the identifier for the first merchant from the product information database and transmitting the product information for the first products to the user terminal; and transmitting, when a payment request for a second product which is any one product selected among the first products and information on the virtual currency amount of the second product are received from the user terminal, a payment processing completion message for the second product to the user terminal after completing transfer processing from the electronic wallet account of a user to the electronic wallet account of the first merchant for the virtual currency amount of the second product, wherein the transmitting of the payment processing completion message for the second product includes:

maintaining a composite information database storing the identifier for each of the plurality of merchants and information on different predetermined Euclidean distance values to be used for user authentication for each merchant to correspond to each other;

verifying, when the information on the virtual currency amount of the second product is received from the user terminal along with the payment request for the second product, the identifier for the first merchant and extracting a first Euclidean distance value stored to correspond to the identifier for the first merchant from the composite information database;

randomly generating, when the first Euclidean distance value is extracted, a random vector and transmitting a transmission request of a feedback vector for the random vector to the user terminal, while the random vector and the identifier for the first merchant to the user terminal, and then when a first feedback vector, in which the first feedback vector is a vector generated so that the Euclidean distance from the random vector is calculated as the first Euclidean distance value prestored in the user terminal, is received as the feedback vector for the random vector from the user terminal, completing authentication for the user terminal by verifying whether the Euclidean distance between the first feedback vector and the random vector is calculated as the first Euclidean distance value; and completing, when the authentication for the user terminal is completed, the transfer processing from the electronic wallet account of the user to the electronic wallet account of the first merchant for the virtual currency amount of the second product.

\* \* \* \* \*